US008589584B2

(12) United States Patent
Archer et al.

(10) Patent No.: US 8,589,584 B2
(45) Date of Patent: *Nov. 19, 2013

(54) PIPELINING PROTOCOLS IN MISALIGNED BUFFER CASES

(71) Applicant: International Business Machines Corporation, Armonk, NY (US)

(72) Inventors: Charles J. Archer, Rochester, MN (US); Michael A. Blocksome, Rochester, MN (US); Bob R. Cernohous, Rochester, MN (US); Joseph D. Ratterman, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/679,708

(22) Filed: Nov. 16, 2012

(65) Prior Publication Data

US 2013/0074086 A1 Mar. 21, 2013

Related U.S. Application Data

(63) Continuation of application No. 12/769,972, filed on Apr. 29, 2010.

(51) Int. Cl.
*G06F 15/16* (2006.01)

(52) U.S. Cl.
USPC ............................ 709/234; 709/232; 709/224

(58) Field of Classification Search
USPC ......... 709/201, 205, 228, 230, 237, 236, 252, 709/248, 246, 243
See application file for complete search history.

(56) References Cited

U.S. PATENT DOCUMENTS

| | | | |
|---|---|---|---|
| 4,942,517 A | | 7/1990 | Cok |
| 5,579,503 A | * | 11/1996 | Osborne ........................ 711/119 |
| 5,581,777 A | | 12/1996 | Kim et al. |
| 6,081,883 A | * | 6/2000 | Popelka et al. .................. 712/28 |
| 6,470,344 B1 | | 10/2002 | Kothuri et al. |
| 6,678,244 B1 | | 1/2004 | Appanna et al. |
| 6,681,388 B1 | | 1/2004 | Sato et al. |
| 6,717,960 B1 | | 4/2004 | Anesko et al. |
| 7,206,805 B1 | | 4/2007 | McLaughlin, Jr. |
| 7,327,781 B2 | | 2/2008 | Loechner |
| 7,522,935 B2 | | 4/2009 | Rey et al. |
| 7,769,856 B2 | * | 8/2010 | Supalov et al. ............... 709/224 |
| 7,773,616 B2 | | 8/2010 | Reilly et al. |
| 7,836,199 B2 | | 11/2010 | Brown et al. |
| 8,001,280 B2 | | 8/2011 | Blumrich et al. |

(Continued)

OTHER PUBLICATIONS

U.S. Appl. No. 12/769,972, entitled "Pipelining Protocols in Misaligned Buffer Cases", filed Apr. 29, 2010.

*Primary Examiner* — John Follansbee
*Assistant Examiner* — Madhu Woolcock
(74) *Attorney, Agent, or Firm* — Patterson & Sheridan LLP

(57) ABSTRACT

Systems, methods and articles of manufacture are disclosed for effecting a desired collective operation on a parallel computing system that includes multiple compute nodes. The compute nodes may pipeline multiple collective operations to effect the desired collective operation. To select protocols suitable for the multiple collective operations, the compute nodes may also perform additional collective operations. The compute nodes may pipeline the multiple collective operations and/or the additional collective operations to effect the desired collective operation more efficiently.

6 Claims, 11 Drawing Sheets

(56) References Cited

U.S. PATENT DOCUMENTS

| | | |
|---|---|---|
| 8,125,903 B2 | 2/2012 | Godor et al. |
| 8,155,006 B2 | 4/2012 | Liu et al. |
| 2003/0120791 A1 | 6/2003 | Weber et al. |
| 2003/0163589 A1 | 8/2003 | Bunce et al. |
| 2004/0010667 A1 | 1/2004 | Brenner |
| 2004/0225719 A1 | 11/2004 | Kisley et al. |
| 2008/0022261 A1 | 1/2008 | Gooding |
| 2008/0250178 A1 | 10/2008 | Haustein et al. |
| 2009/0031001 A1 | 1/2009 | Archer et al. |

\* cited by examiner

PIPELINING PROTOCOLS IN MISALIGNED BUFFER CASES

This application is a continuation of co-pending U.S. patent application Ser. No. 12/769,972, filed Apr. 29, 2010. The aforementioned related patent application is herein incorporated by reference in its entirety.

BACKGROUND

1. Field

Embodiments of the invention relate generally to parallel processing and more particularly to collective operations on a parallel computing system.

2. Description of the Related Art

Powerful computers may be designed as highly parallel systems where the processing activity of hundreds, if not thousands, of processors (CPUs) are coordinated to perform computing tasks. These systems are highly useful for a broad variety of applications, including financial modeling, hydrodynamics, quantum chemistry, astronomy, weather modeling and prediction, geological modeling, prime number factoring, image processing (e.g., CGI animations and rendering), to name but a few examples.

For example, one family of parallel computing systems has been (and continues to be) developed by International Business Machines (IBM) under the name Blue Genet. The Blue Gene/L architecture provides a scalable, parallel computer that may be configured with a maximum of 65,536 ($2^{16}$) compute nodes. Each compute node includes a single application specific integrated circuit (ASIC) with 2 CPU's and memory. The Blue Gene/L architecture has been successful and on Oct. 27, 2005, IBM announced that a Blue Gene/L system had reached an operational speed of 280.6 teraflops (280.6 trillion floating-point operations per second), making it the fastest computer in the world at that time. Further, as of June 2005, Blue Gene/L installations at various sites worldwide were among five out of the ten top most powerful computers in the world.

IBM has developed a successor to the Blue Gene/L system, named Blue Gene/P. Blue Gene/P is designed to be the first computer system to operate at a sustained 1 petaflops (1 quadrillion floating-point operations per second). Like the Blue Gene/L system, the Blue Gene/P system is scalable with a projected maximum of 73,728 compute nodes. Each compute node in Blue Gene/P is designed to include a single application specific integrated circuit (ASIC) with 4 CPU's and memory. A complete Blue Gene/P system is designed to include 72 racks with 32 node boards per rack.

In addition to the Blue Gene architecture developed by IBM, other highly parallel computer systems have been (and are being) developed. For example, a Beowulf cluster may be built from a collection of commodity off-the-shelf personal computers. In a Beowulf cluster, individual computer systems are connected using local area network technology (e.g., Ethernet) and system software is used to execute programs written for parallel processing on the cluster.

The compute nodes in a parallel system communicate with one another over one or more communication networks. For example, the compute nodes of a Blue Gene/L system are interconnected using five specialized networks. The primary communication strategy for the Blue Gene/L system is message passing over a torus network (i.e., a set of point-to-point links between pairs of nodes). The torus network allows application programs developed for parallel processing systems to use high level interfaces such as Message Passing Interface (MPI) and Aggregate Remote Memory Copy Interface (ARMCI) to perform computing tasks and to distribute data among a set of compute nodes. Other parallel architectures (e.g., a Beowulf cluster) also use MPI and ARMCI for data communication between compute nodes. Of course, other message passing interfaces have been (and are being) developed. Low level network interfaces communicate higher level messages using small messages known as packets. Typically, MPI messages are encapsulated in a set of packets which are transmitted from a source node to a destination node over a communications network (e.g., the torus network of a Blue Gene system).

A "message passing protocol" is a set of instructions specifying how to create a set of packets from a message and how to reconstruct the message from a packet stream. Message passing protocols may be used to transmit packets in different ways depending on the desired communication characteristics. In a parallel system where a compute node has multiple communication links to other nodes, each compute node can send a point-to-point message to any other node.

SUMMARY

One embodiment of the invention includes a method for performing a specified collective operation on a parallel computer comprising a plurality of compute nodes, each compute node having at least a processor and a memory. The method may generally include performing a first collective operation by a source node and a plurality of target nodes to determine a characteristic of each of the target nodes, selecting a target protocol based on the characteristic of each of the target nodes, and performing the specified collective operation by the source node and the plurality of target nodes using the target protocol. The method may further include performing a second collective operation by one of the target nodes and a plurality of downstream nodes to determine a characteristic of each of the downstream nodes. From the plurality of protocols, a downstream protocol is selected based on the characteristic of each of the downstream nodes and the specified collective operation is performed by the target node and the plurality of downstream nodes using the downstream protocol.

Another embodiment of the invention includes a computer-readable storage medium containing a program which, when executed, performs an operation to effect a specified collective operation on a parallel computer comprising a plurality of compute nodes. The operation may generally include performing a first collective operation by a source node and a plurality of target nodes to determine a characteristic of each of the target nodes, selecting a target protocol based on the characteristic of each of the target nodes, and performing the specified collective operation by the source node and the plurality of target nodes using the target protocol. The operation may also include performing a second collective operation by one of the target nodes and a plurality of downstream nodes to determine a characteristic of each of the downstream nodes. From the plurality of protocols, a downstream protocol is selected based on the characteristic of each of the downstream nodes and the specified collective operation is performed by the target node and the plurality of downstream nodes using the downstream protocol.

Another embodiment of the invention includes a parallel computing system. The parallel computing system may include a plurality of compute nodes, each having at least a processor and a memory. A source node, of the plurality of compute nodes may be configured to perform an operation to effect a specified collective operation. The operation itself may generally include performing a first collective operation by a source node and a plurality of target nodes to determine a characteristic of each of the target nodes, selecting a target protocol based on the characteristic of each of the target nodes, and performing the specified collective operation by the source node and the plurality of target nodes using the target protocol. The operation may also include performing a second collective operation by one of the target nodes and a plurality of downstream nodes to determine a characteristic of each of the downstream nodes. From the plurality of protocols, a downstream protocol is selected based on the characteristic of each of the downstream nodes and the specified collective operation is performed by the target node and the plurality of downstream nodes using the downstream protocol.

BRIEF DESCRIPTION OF THE SEVERAL VIEWS OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
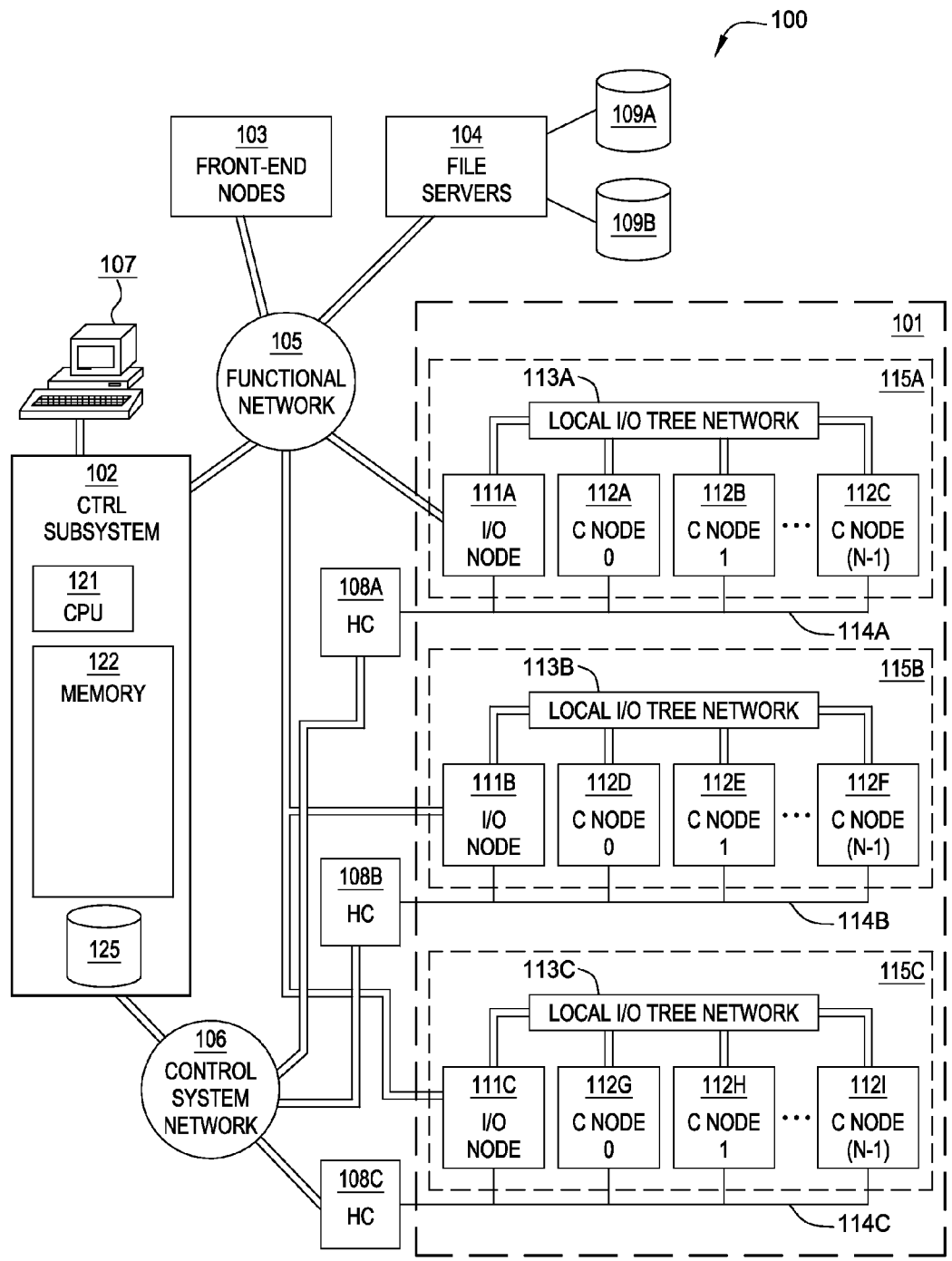
FIG. 1 is a block diagram of components of a massively parallel computer system, according to one embodiment of the present invention.

Embodiments of the invention perform collective operations on compute nodes of a parallel computer, using a set of collective protocols. Parallel computing systems often include collective protocols, each of which provide particular advantages (e.g., transfer speed) and constraints (e.g., requiring buffers of compute nodes to be 16-byte aligned, requiring a message size of under 208 bytes, etc.). As used herein, a collective protocol refers to a message passing protocol used by a collective operation. A collective operation is a message-passing instruction that is executed simultaneously (or approximately so) by all the compute nodes of an operational group of compute nodes. Such an operational group may include all the compute nodes in the parallel computer or a subset of all the compute nodes. An operational group may be implemented, for example, as an MPI "communicator."

Examples of collective operations include a broadcast operation, a reduce operation, and an allreduce operation. A broadcast operation is a collective operation for moving data among compute nodes of an operational group. A reduce operation is a collective operation that executes arithmetic or logical functions on data distributed among the compute notes of an operational group. An allreduce operation functions as a reduce, followed by a broadcast (to store the result of the reduce operation in the result buffer of each process). Further, depending on the implementation of the allreduce operation, the allreduce operation may be more efficient than the reduce followed by the broadcast.

Some collective operations have a single originating or receiving process running on a particular node in an operational group. For example, in a broadcast operation, the process on the compute note that distributes the data to all the other compute nodes is an originating process. In a gather operation, the process on the compute node that receives data from all the other compute nodes is a receiving process. The compute node on which such an originating or receiving process runs is referred to as a logical root. The originating or receiving process may also be referred to as the root process.

Selecting a suitable protocol for a given collective operation may require the root process to have nonlocal knowledge—i.e., knowledge about other compute nodes of the operational group. For example, a broadcast operation may use either a memfifo protocol or a direct-put (dput) protocol. The dput protocol puts data into the memory of destination nodes, but requires the buffers of all the destination nodes to be aligned (e.g., 16-byte aligned). The memfifo protocol puts data into a reception fifo of the destination nodes (which may be slower than the dput protocol) but does not require the buffers to be aligned. To select the suitable protocol for the broadcast operation (i.e., dput or memfifo), each node needs to know whether all of the other nodes in the operational group have buffers that are 16-byte aligned. Accordingly, the compute nodes in the operational group, prior to the actual collective operation (i.e., the broadcast), perform an additional collective operation to collect the nonlocal knowledge about 16-byte alignment. This additional collective operation may be referred to as a pre-allreduce operation. If the pre-allreduce operation reveals that all of the destination nodes have 16-byte aligned buffers, each node may enter the broadcast operation using the dput protocol. On the other hand, if the pre-allreduce operation reveals that one or more of the destination node has a buffer that is not 16-byte aligned, each node may enter the broadcast using the memfifo protocol.

Although the pre-allreduce operation allows the compute nodes to enter the broadcast using the suitable protocol, the pre-allreduce operation creates additional latency. In certain cases, such as in broadcasting small messages, this additional latency may be substantial (relative to the latency of the broadcast). Further, if a particular node is delayed in entering a collective operation, other nodes in the operational group are also delayed in performing the collective operation.

In one embodiment, to reduce the latency of some collective operations, the compute nodes "pipeline" the additional collective operation (i.e., the collective operation to determine alignment) and/or the actual collective operation. For example, to effect a collective operation for an operational group of compute nodes, the compute nodes may segment the operational group into multiple neighborhoods and stagger multiple collective operations amongst the neighborhoods. Each neighborhood may correspond to a line of nodes in a torus network. Advantageously, a late-arriving node (i.e., a compute node that is delayed in entering a collective operation) delays only nodes in the immediate neighborhood and any downstream neighborhood(s) of the late-arriving node—rather than all other nodes in the operational group. Consequently, the parallel computing system may perform collective operations (and select suitable protocols) more efficiently.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram of components of a massively parallel computer system 100, according to one embodiment of the present invention. Illustratively, computer system 100 shows the high-level architecture of an IBM Blue Gene® computer system, it being understood that other parallel computer systems could be used, and the description of a preferred embodiment herein is not intended to limit the present invention.

As shown, computer system 100 includes a compute core 101 having a number of compute nodes arranged in a regular array or matrix, which perform the useful work performed by system 100. The operation of computer system 100, including compute core 101, may be controlled by control subsystem 102. Various additional processors in front-end nodes 103 may perform auxiliary data processing functions, and file servers 104 provide an interface to data storage devices such as disk based storage 109A, 109B or other I/O (not shown). Functional network 105 provides the primary data communication path among compute core 101 and other system components. For example, data stored in storage devices attached to file servers 104 is loaded and stored to other system components through functional network 105.

Also as shown, compute core 101 includes I/O nodes 111A-C and compute nodes 112A-I. Compute nodes 112 provide the processing capacity of parallel system 100, and are configured to execute applications written for parallel processing. I/O nodes 111 handle I/O operations on behalf of compute nodes 112. Each I/O node 111 may include a processor and interface hardware that handles I/O operations for a set of N compute nodes 112, the I/O node and its respective set of N compute nodes are referred to as a Pset. Compute core 101 contains M Psets 115A-C, each including a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by compute core 101 to execute user applications, as well as data output produced by the compute core 101, is communicated over functional network 105. The compute nodes within a Pset 115 communicate with the corresponding I/O node over a corresponding local I/O tree network 113A-C. The I/O nodes, in turn, are connected to functional network 105, over which they communicate with I/O devices attached to file servers 104, or with other system components. Thus, the local I/O tree networks 113 may be viewed logically as extensions of functional network 105, and like functional network 105 are used for data I/O, although they are physically separated from functional network 105.

Control subsystem 102 directs the operation of the compute nodes 112 in compute core 101. Control subsystem 102 is a computer that includes a processor (or processors) 121, internal memory 122, and local storage 125. An attached console 107 may be used by a system administrator or similar person. Control subsystem 102 may also include an internal database which maintains state information for the compute nodes in core 101, and an application which may be configured to, among other things, control the allocation of hardware in compute core 101, direct the loading of data on compute nodes 111, and perform diagnostic and maintenance functions.

Control subsystem 102 communicates control and state information with the nodes of compute core 101 over control system network 106. Network 106 is coupled to a set of hardware controllers 108A-C. Each hardware controller communicates with the nodes of a respective Pset 115 over a corresponding local hardware control network 114A-C. The hardware controllers 108 and local hardware control networks 114 are logically an extension of control system network 106, although physically separate.

In addition to control subsystem 102, front-end nodes 103 provide computer systems used to perform auxiliary functions which, for efficiency or otherwise, are best performed outside compute core 101. Functions which involve substantial I/O operations are generally performed in the front-end nodes. For example, interactive data input, application code editing, or other user interface functions are generally handled by front-end nodes 103, as is application code compilation. Front-end nodes 103 are connected to functional network 105 and may communicate with file servers 104.

Figure 2:
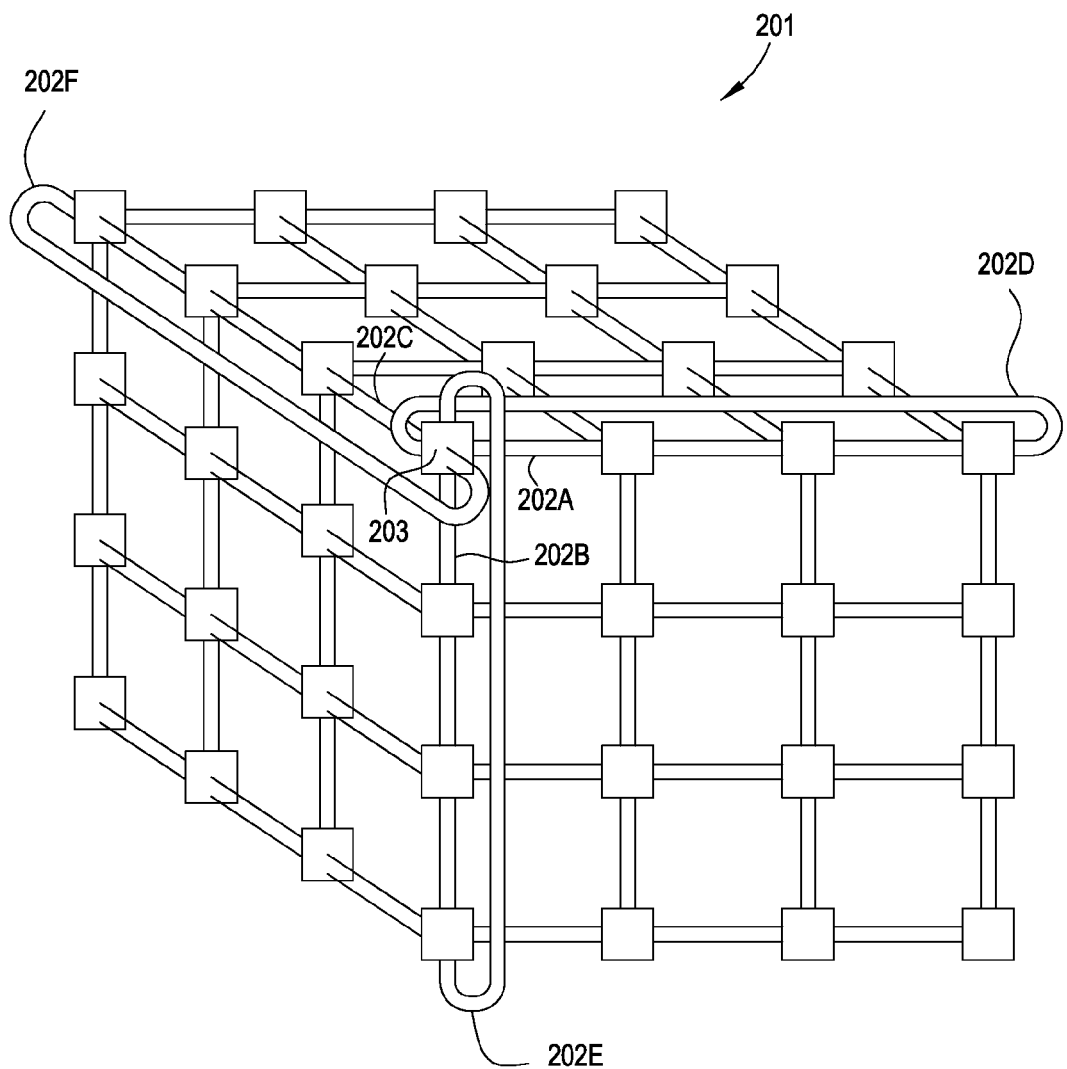
FIG. 2 is a conceptual illustration of a three-dimensional torus network of the system of FIG. 1, according to one embodiment of the invention.

In one embodiment, compute nodes 112 are arranged logically in a three-dimensional torus, where each compute node 112 may be identified using an x, y and z coordinate. FIG. 2 is a conceptual illustration of a three-dimensional torus network of system 100, according to one embodiment of the invention. More specifically, FIG. 2 illustrates a 4×4×4 torus 201 of compute nodes, in which the interior nodes are omitted for clarity. Although FIG. 2 shows a 4×4×4 torus having 64 nodes, it will be understood that the actual number of compute nodes in a parallel computing system is typically much larger. For example, a complete Blue Gene/L system includes 65,536 compute nodes. Each compute node 112 in torus 201 includes a set of six node-to-node communication links 202A-F which allows each compute nodes in torus 201 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 201, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y, or z dimensions form a torus in that dimension because the point-to-point communication links logically wrap around. For example, this is represented in FIG. 2 by links 202D, 202E, and 202F which wrap around from a last node in the x, y and z dimensions to a first node. Thus, although node 203 appears to be at a "corner" of the torus, node-to-node links 202A-F link node 203 to nodes 202D, 202E, and 202F, in the x, y, and Z dimensions of torus 201.

Figure 3:
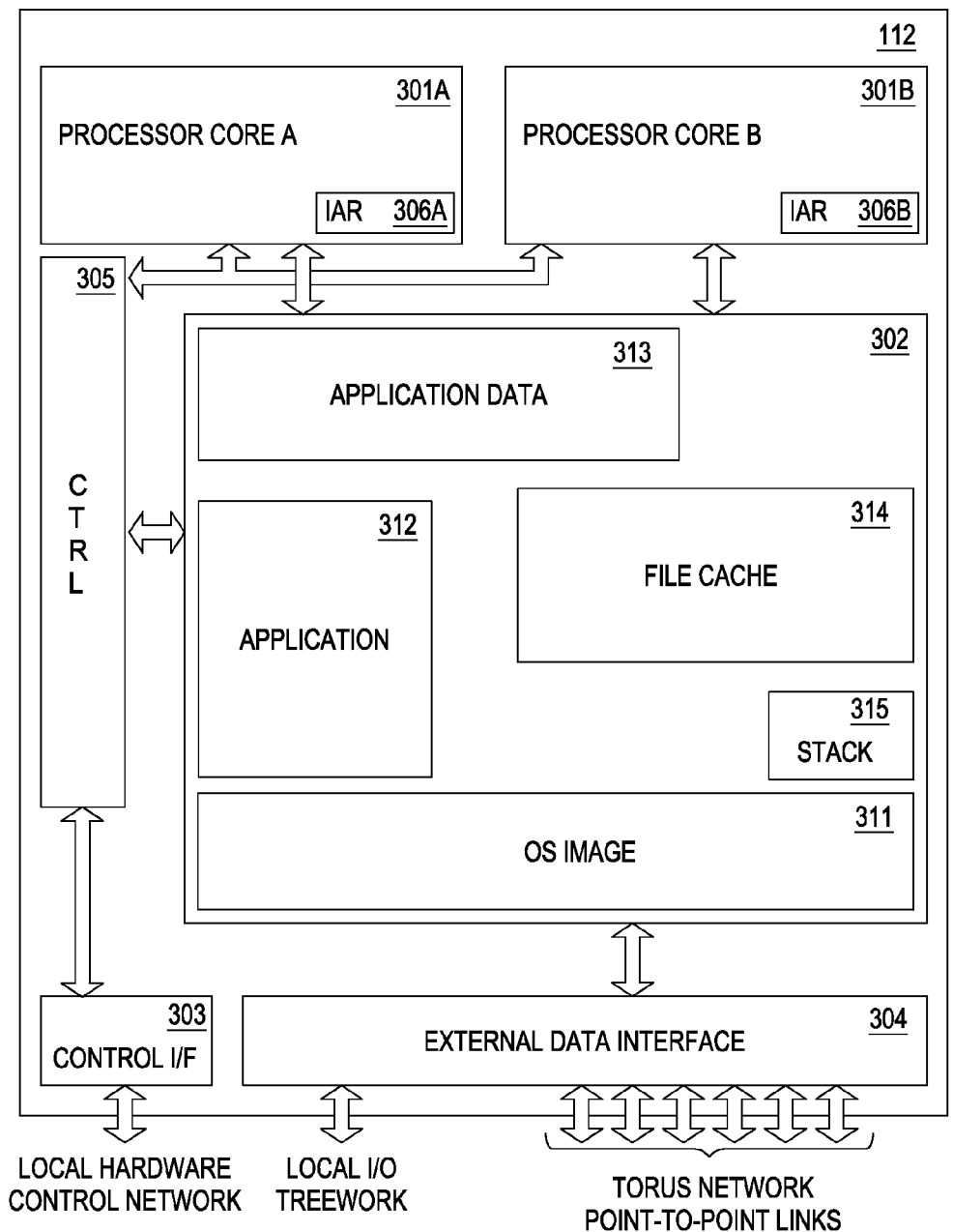
FIG. 3 is a diagram of a compute node of the system of FIG. 1, according to one embodiment of the invention.

FIG. 3 is a diagram of a compute node 112 of the system 100 of FIG. 1, according to one embodiment of the invention. As shown, compute node 112 includes processor cores 301A and 301B, and also includes memory 302 used by both processor cores 301; an external control interface 303 which is coupled to local hardware control network 114; an external data communications interface 304 which is coupled to the corresponding local I/O tree network 113, and the corresponding six node-to-node links 202 of the torus network 201; and monitoring and control logic 305 which receives and responds to control commands received through external control interface 303. Monitoring and control logic 305 may access processor cores 301 and locations in memory 302 on behalf of control subsystem 102 to read (or in some cases alter) the operational state of node 112. In one embodiment, each node 112 may be physically implemented as a single, discrete integrated circuit chip.

As described, functional network 105 may service many I/O nodes, and each I/O node is shared by multiple compute nodes 112. Thus, it is apparent that the I/O resources of parallel system 100 are relatively sparse when compared to computing resources. Although it is a general purpose computing machine, parallel system 100 is designed for maximum efficiency in applications which are computationally intense.

As shown in FIG. 3, memory 302 stores an operating system image 311, an application code image 312, and user application data structures 313 as required. Some portion of memory 302 may be allocated as a file cache 314, i.e., a cache of data read from or to be written to an I/O file. Operating system image 311 provides a copy of a simplified-function operating system running on compute node 112. Operating system image 311 may includes a minimal set of functions required to support operation of the compute node 112. In a Blue Gene system, for example, operating system image 311 contains a version of the Linux® operating system customized to run on compute node 112. Of course, other operating systems may be used, and further it is not necessary that all nodes employ the same operating system. (Also note, Linux® is a registered trademark of Linus Torvalds in the United States and other countries.)

Application code image 312 represents a copy of the application code being executed by compute node 112. Application code image 302 may include a copy of a computer program being executed by system 100, but where the program is very large and complex, it may be subdivided into portions which are executed by different compute nodes 112. Memory 302 may also include a call-return stack 315 for storing the states of procedures which must be returned to, which is shown separate from application code image 302, although it may be considered part of application code state data.

As part of ongoing operations, application 312 may be configured to transmit messages from compute node 112 to other compute nodes in parallel system 100. For example, the high level MPI call of MPI_Send( ); may be used by application 312 to transmit a message from one compute node to another. On the other side of the communication, the receiving node may call use the MPI call MPI_Recieve( ); to receive and process the message. As described above, in a Blue Gene system, the external data interface 304 may be configured to transmit the high level MPI message by encapsulating it within a set of packets and transmitting the packets of over the torus network of point-to-point links. Other parallel systems also include a mechanism for transmitting messages between different compute nodes. For example, nodes in a Beowulf cluster may communicate using a using a high-speed Ethernet style network.

Figure 4A:
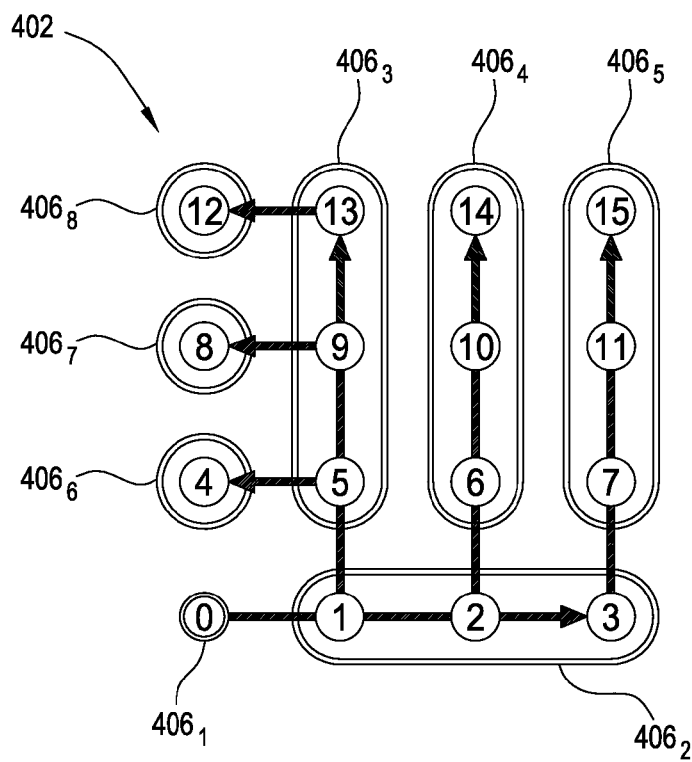
FIGS. 4A-4B illustrate compute nodes of the parallel computing system that are configured to form a logical tree, according to one embodiment of the invention.
Figure 4B:
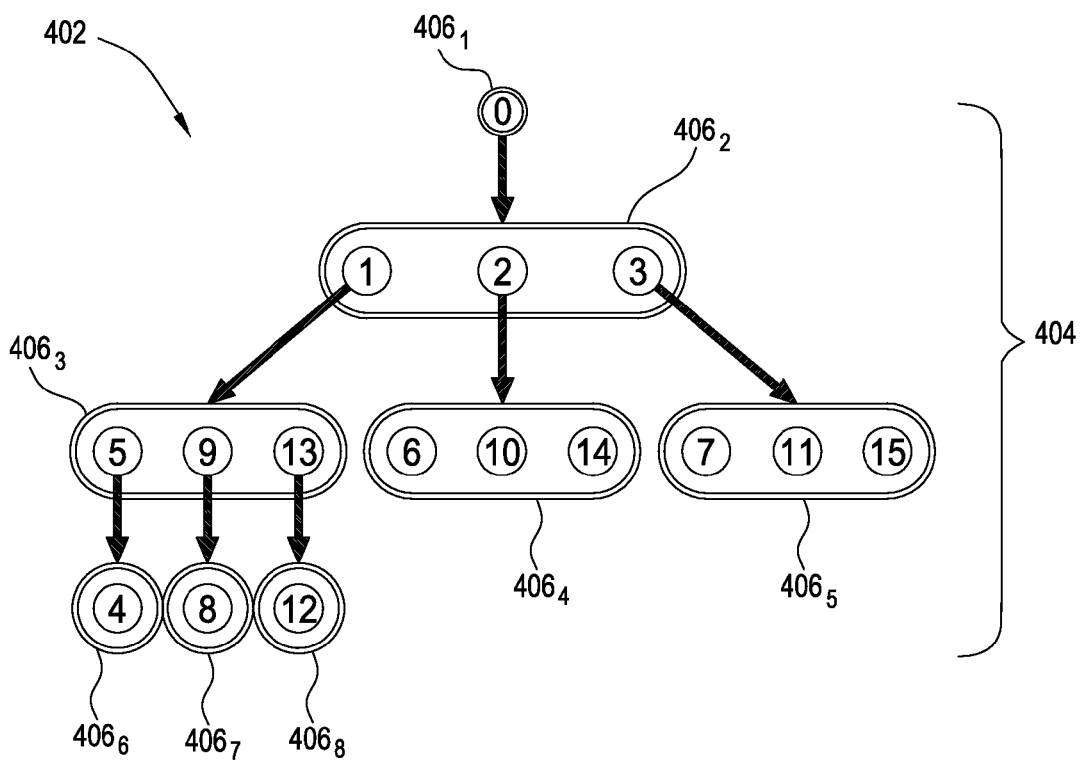

FIGS. 4A-4B illustrate the compute nodes 402 of the parallel computing system that are configured to form a logical tree 404, according to one embodiment of the invention. Each tree node 406, when combined with a parent compute node, corresponds to a neighborhood of compute nodes. Each neighborhood may be derived from the network topology of the compute nodes. For example, a neighborhood may correspond to a line of a torus network. Each compute node may be part of a first neighborhood, referred to herein as an immediate neighborhood. Each compute node may also be part of a second neighborhood, referred to herein as a downstream neighborhood. For example, the immediate neighborhood of compute node 1 includes compute nodes 0-3. The downstream neighborhood of compute node 1 includes compute nodes 1, 5, 9 and 13. In contrast, the compute node 4 is only part of a single neighborhood—an immediate neighborhood that includes nodes 4-5. That is, the compute node 4 is not part of any downstream neighborhood in this example.

FIGS. 5A-5G illustrate, in a chronological fashion, the compute nodes 402 pipelining a collective operation, according to one embodiment of the invention. Assume that the compute nodes 402 are to perform a broadcast operation for a message M. That is, the operational group of the broadcast operation includes the sixteen compute nodes 402. The compute nodes 402 may effect the broadcast operation by staggering multiple broadcast operations (as well as pre-allreduce operations to determine the broadcast protocol) among neighborhoods of the operational group. Assume that compute node 0 is the logical root of the broadcast operation. Rather than entering a pre-allreduce operation with the other fifteen compute nodes (followed by entering a broadcast operation with the other fifteen compute nodes), the compute node 0 may enter a pre-allreduce operation with its downstream neighborhood (i.e., nodes 0-3) using the memfifo protocol. The pre-allreduce operation essentially entails: (i) the compute node 0 asking whether each of the other nodes of the downstream neighborhood (i.e., nodes 1-3) have buffers that are 16-byte aligned; (ii) each of the other nodes replying affirmatively or negatively to the compute node 0; and (iii) compute node 0 broadcasting the received replies to each of the other nodes. To facilitate understanding of the disclosure, the FIGS. 5A-5G show steps (i) and (ii) of the pre-allreduce operation, according to one embodiment of the invention.

Figure 5A:
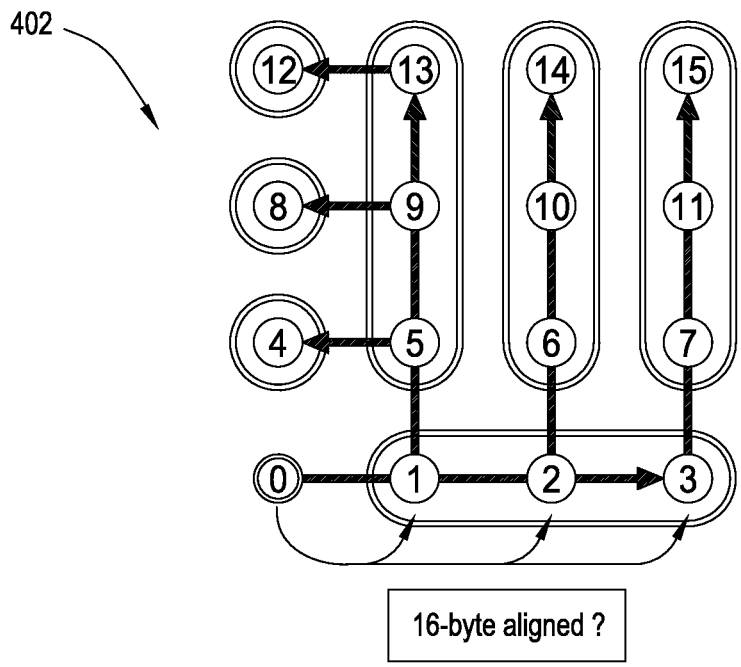
FIGS. 5A-5G illustrate, in a chronological fashion, the compute nodes pipelining a collective operation, according to one embodiment of the invention.
Figure 5B:
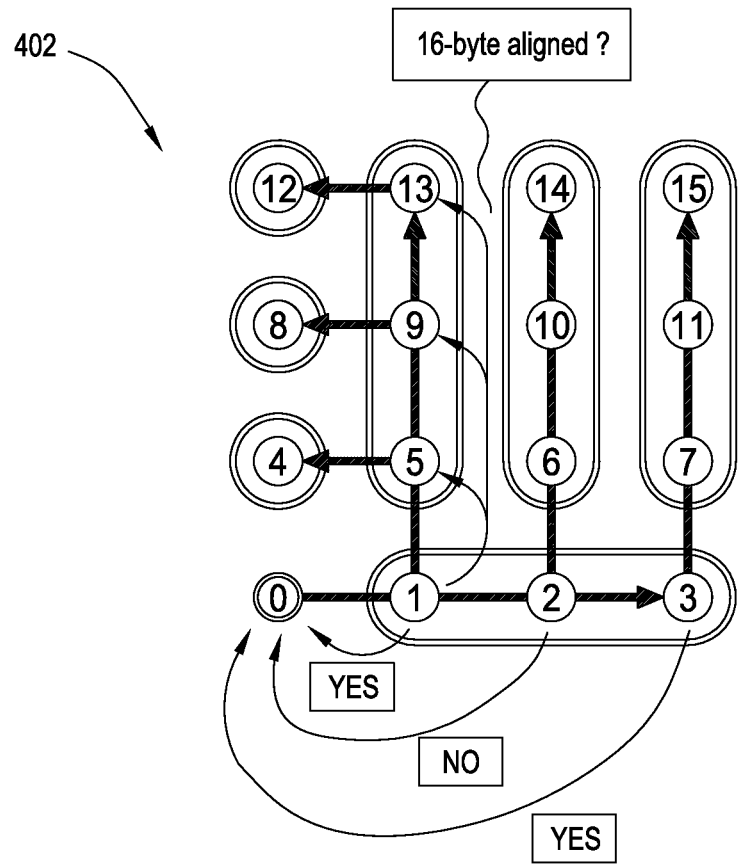

FIGS. 5A-5B illustrate the downstream neighborhood of compute node 0 performing a pre-allreduce operation, according to one embodiment of the invention. As described above, the compute node 0 may ask whether each of the other nodes have buffers that are 16-byte aligned. For example, the compute node 0 broadcasts a request-to-send (RTS) message using the memfifo protocol to all nodes on the same line of the torus network. The message may specify a reception counter to be used by each receiving node. If a receiving node has a buffer that is 16-byte aligned, the receiving node may initialize the reception counter and send a positive acknowledgment (ACK) to the compute node 0. On the other hand, if the buffer is not 16-byte aligned, the receiving node may send a negative acknowledgment (NACK) to the compute node 0. In the example illustrated in FIG. 5B, the compute node 0 receives: (i) an ACK from compute node 1; (ii) a NACK from compute node 2; and (iii) an ACK from compute node 3.

As described above, the dput protocol may be faster than the memfifo protocol, but the dput protocol may only be used when all receiving nodes have a buffer that is 16-byte aligned. Because the NACK received from compute node 2 indicates that compute node 2 has a buffer that is not 16-byte aligned, the compute nodes of the immediate neighborhood (i.e., nodes 0-3) should perform the broadcast operation using the memfifo protocol rather than the dput protocol.

Figure 5C:
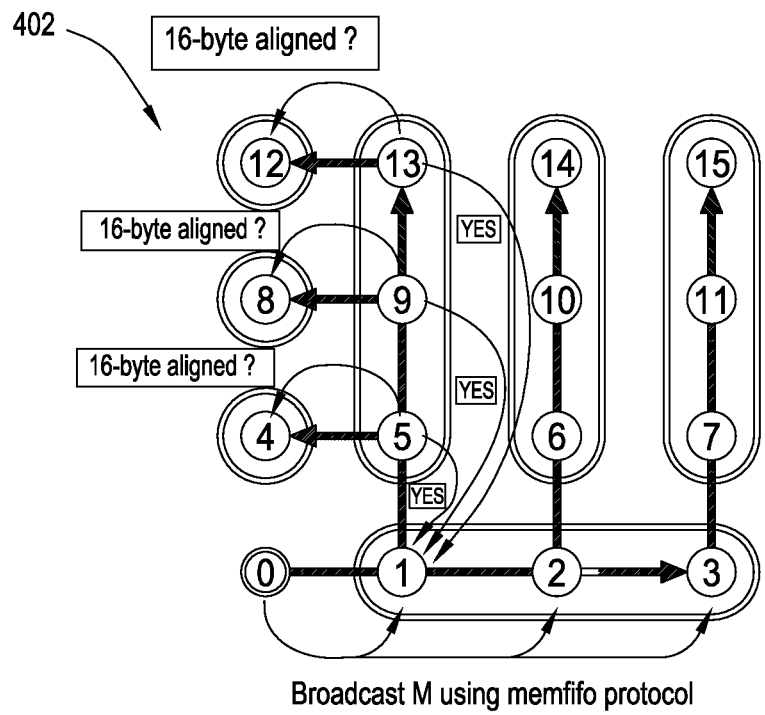

FIG. 5C illustrates compute node 0 broadcasting the message M to compute nodes 1-3 using the memfifo protocol, according to one embodiment of the invention. The compute node 0 may broadcast a "clear" message to the other compute nodes of the immediate neighborhood (i.e., nodes 1-3). The "clear" message prompts the compute nodes to free any allocated reception counter. The compute node 0 may then broadcast the message M using a memfifo descriptor. The broadcast operation on the compute node 0 is complete when the entire source buffer of the compute node 0 is injected onto the network. The processor of each receiving node copies each received packet into the destination buffer of the respective receiving node. The broadcast operation on the receiving node is complete when the entire destination buffer of the receiving node has been written.

In one embodiment, each receiving node may perform a pre-allreduce operation (and a subsequent broadcast operation) with the downstream neighborhood of the respective receiving node. For example, the compute node 1 may perform a pre-allreduce operation with other compute nodes of its downstream neighborhood (i.e., nodes 5, 9 and 13). Similarly, compute node 2 may perform a pre-allreduce operation with nodes 6, 10 and 14. Further, compute node 3 may perform a pre-allreduce operation with nodes 7, 11 and 15. To facilitate understanding of the disclosure, FIGS. 5B-5C illustrate the pre-allreduce operation for the downstream neighborhood of compute node 1, according to one embodiment of the invention.

In one embodiment, each compute node may enter a pre-allreduce operation with its downstream neighborhood prior to receiving all (or any of) the broadcast message M from an upstream node. For example, as shown in FIGS. 5B-5C, compute node 1 need not wait to receive the broadcast message M before asking whether compute nodes 5, 9 and 13 have buffers that are 16-byte aligned.

In one embodiment, the above-described step of each receiving node performing a pre-allreduce operation (and the subsequent broadcast operation) may be repeated in a recursive manner for neighborhoods further downstream. For example, as shown in FIGS. 5C-5F, compute node 13 may perform a pre-allreduce with compute node 12. Similarly, compute node 9 may perform a pre-allreduce with compute node 8. Likewise, compute node may perform a pre-allreduce with compute node 4. In this manner, the compute nodes 0-15 perform collective operations that are staggered in time relative to one another—all to effect an overall collective operation (such as broadcasting the message M to all compute nodes). Advantageously, the compute nodes may reduce the latency associated with effecting the overall collective operation.

Figure 5D:
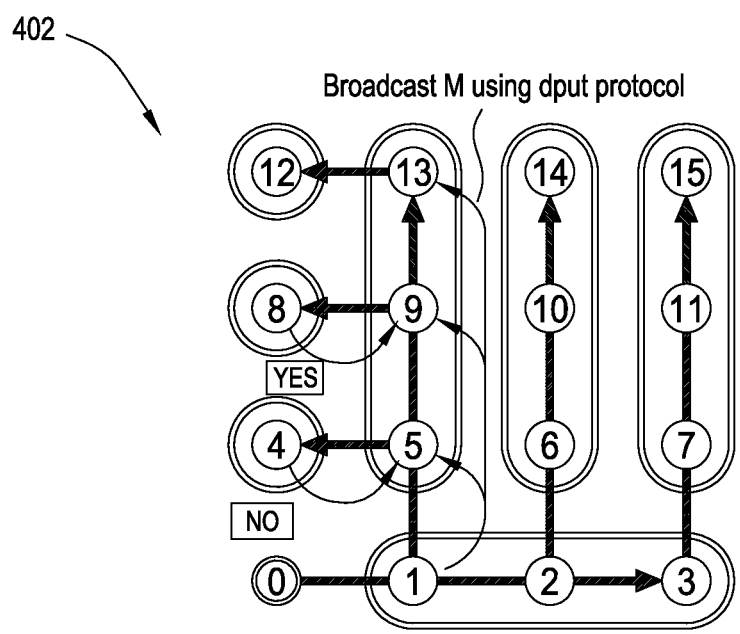
Figure 5E:
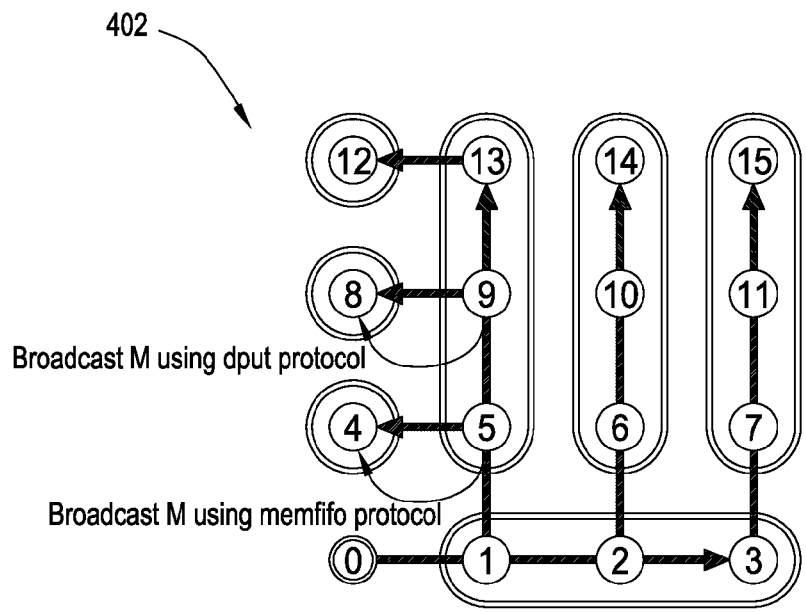

As described above, FIGS. 5B-5C illustrates the pre-allreduce operation for the downstream neighborhood of compute node 1, according to one embodiment of the invention. In the example illustrated in FIG. 5C, the compute node 1 receives ACKs from compute nodes 5, 9 and 13, respectively. Accordingly, the compute nodes 1, 5, 9 and 13 may perform the broadcast operation using the dput protocol. As shown in FIG. 5D, the compute node 1 broadcasts the message M to the compute nodes 5, 9 and 13 using the dput protocol. For example, the compute node 1 may use a direct-put descriptor to broadcast a source buffer of the compute node 1 down its line of the torus network. The broadcast operation on the compute node 1 is complete when the entire source buffer has been injected onto the torus network. On the receiving nodes 5, 9 and 13, the broadcast operation is complete when the reception counter hits zero—indicating that the entire destination buffer has been written. The receiving nodes 5, 9 and 13 may then free the allocated reception counter.

Figure 5F:
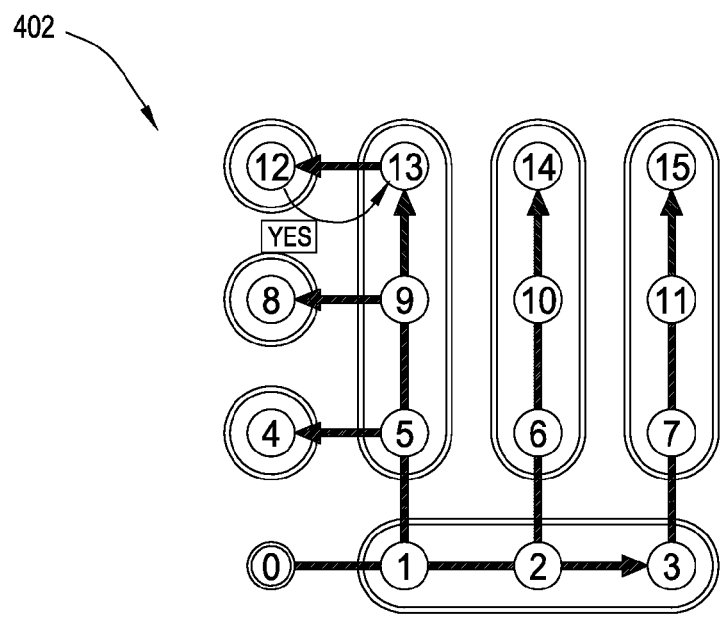
Figure 5G:
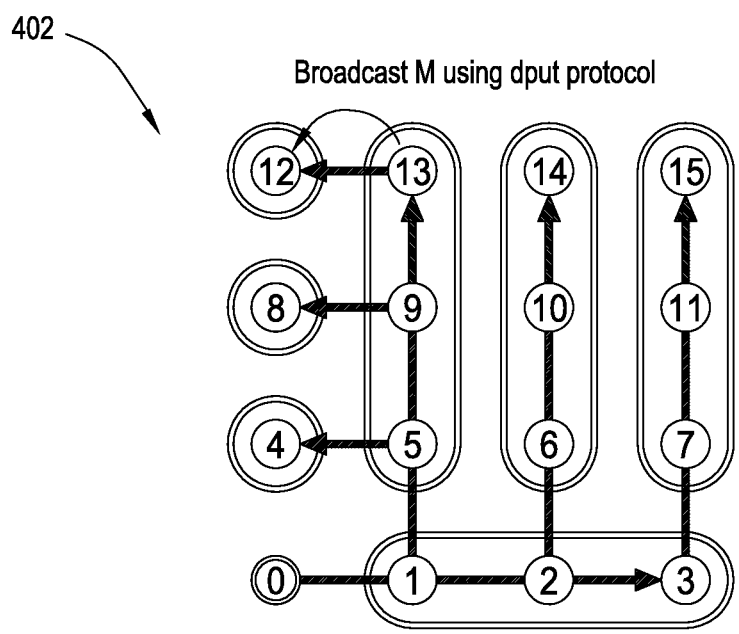

In one embodiment, a compute node that is delayed in entering a collective operation may delay other compute nodes that have already entered the collective operation. For example, FIG. 5D illustrates compute node 13 entering a pre-allreduce operation involving compute node 12, according to one embodiment of the invention. Similarly, compute node 9 enters a pre-allreduce operation with compute node 8, while compute node 5 enters a pre-allreduce operation with compute node 4. Unlike compute nodes 4 and 8, however, compute node 12 is delayed in entering the collective operation with compute node 13. That is, compute node 12 is delayed in sending an ACK (or NACK) to the compute node 13. Advantageously, by pipelining collective operations using the techniques disclosed herein, the late arrival of the compute node 12 to the collective operation only delays the message M being transmitted from the compute node 13 to the compute node 12. That is, the late arrival of the compute node 12 does not delay the message M from being transmitted from the compute node 0 to every other compute node 1-15. Much to the contrary, compute nodes 0-11 and 13-15 can receive the message M prior to the compute node 12 arriving at the pre-allreduce collective. Further, compute nodes 0-11 and 14-15 can exit the pre-allreduce/broadcast operations prior to the arrival of the compute node 12. And as shown in FIG. 5F, once the compute node 12 arrives, the compute node 12 may send an ACK to the compute node 13 and exit the pre-allreduce collective. As shown in FIG. 5G, the compute node 13 may broadcast the message M (which is already available at the compute node 13 at this point) to the compute node 12 and exit the broadcast collective. Once the compute node 12 has received the message M, the compute node 12 can also exit the broadcast collective.

Figure 6:
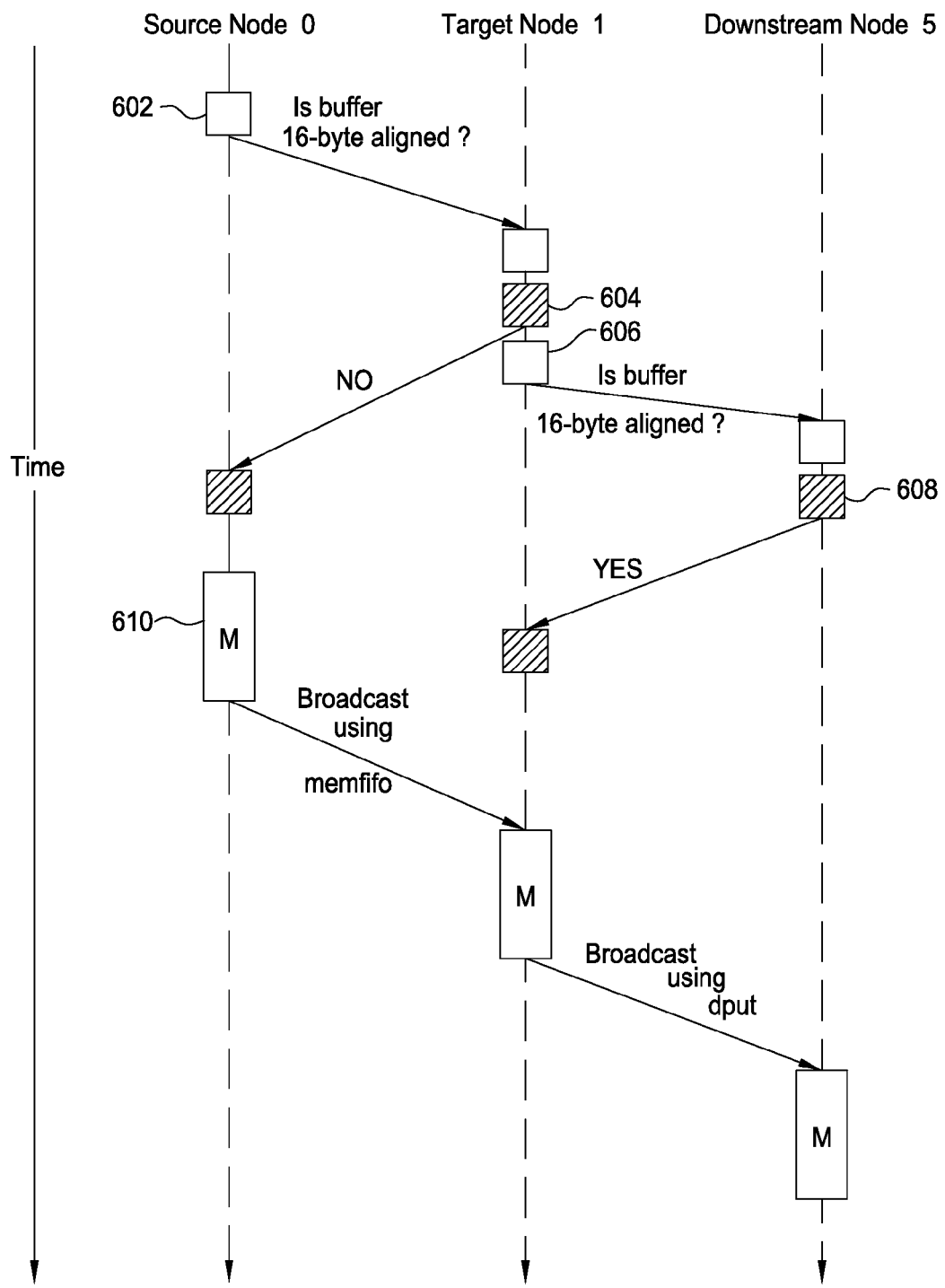
FIG. 6 is a sequence diagram illustrating a pipelined collective operation, according to one embodiment of the invention.

FIG. 6 is a sequence diagram illustrating a pipelined collective operation, according to one embodiment of the invention. As shown, the compute node 0 sends an RTS message 602 to the compute node 1. Assume that the compute node 1 has a buffer that is not 16-byte aligned. In response to the RTS message 602, the compute node 1 may reply to the compute node 1 using a NACK 604, to indicate that the buffer is not 16-byte aligned. The compute node 1 may also send an RTS message 606 to compute node 5, which may reply to the compute node 1 using an ACK 608, to indicate that the buffer of the compute node 5 is 16-byte aligned.

As shown in FIG. 6, after receiving the NACK from the compute node 1, the compute node 0 may broadcast the message M 610 to compute node 1 (and to compute nodes 2 and 3) using the memfifo protocol. Compute node 1 may then broadcast the message M 610 to compute nodes 5 (and to compute nodes 9 and 13) using the dput protocol (assuming, of course, that compute nodes 9 and 13 also have buffers that are 16-byte aligned). Advantageously, by using the techniques described herein, the compute nodes may stagger multiple collective operations to effect an overall collective operation with reduced latency.

Figure 7:
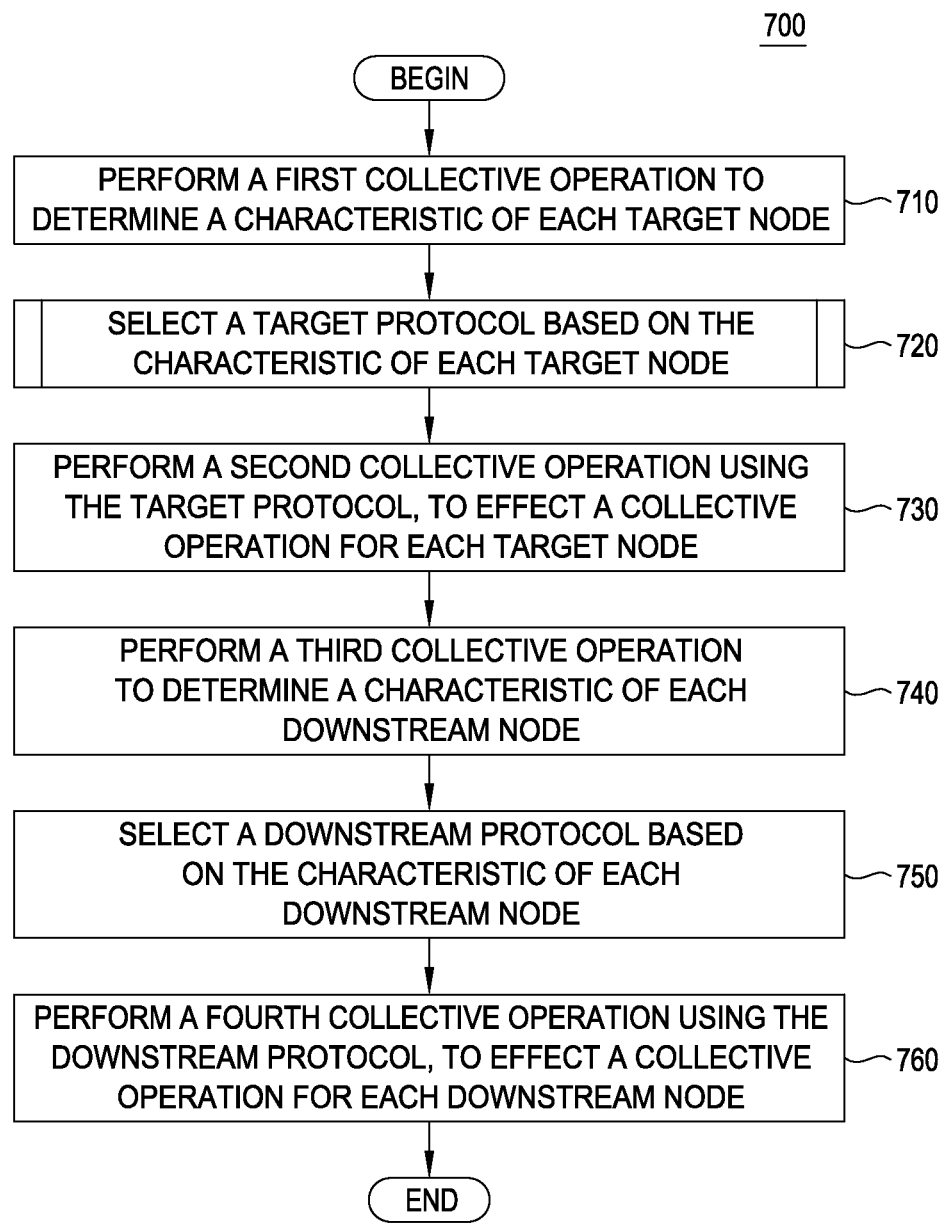
FIG. 7 is a flow diagram depicting a method for effecting a collective operation in a parallel computing system, according to one embodiment of the invention.

FIG. 7 is a flow diagram depicting a method 700 for effecting a collective operation in a parallel computing system, according to one embodiment of the invention. The method 700 is described with respect to an application that uses an application programming interface (API) (such as an MPI library). Of course, the techniques herein may be implemented in the application and/or as part of the API library. Assume the desired collective operation is a broadcast operation. As shown, the method 700 beings at step 710, where the application performs a first collective operation involving a source node and target nodes to determine a characteristic of each target node. For example, the application may perform a pre-allreduce to determine whether each target node has a buffer that is 16-byte aligned. At step 720, the application selects a target protocol based on the characteristic of each target node. The step 720 is further described below in conjunction with FIG. 9.

Assume that the target protocol is the memfifo protocol. At step 730, the application performs a second collective operation using the target protocol, to effect the collective operation for each target node. For example, the application may perform a broadcast operation involving the source node and the target nodes and using the memfifo protocol. At step 740, the application performs a third collective operation involving one of the target nodes and downstream nodes (i.e., that are downstream from the target node) to determine a characteristic of each downstream node. For example, the application may perform a pre-allreduce to determine whether each downstream node has a buffer that is 16-byte aligned.

At step 750, the application selects a target protocol (e.g., the dput protocol) based on the characteristic of each downstream node. At step 760, the application performs a fourth collective operation using the downstream protocol, to effect the collective operation for each downstream node. For example, the application 312 may perform a broadcast operation involving the target node and the downstream nodes and using the dput protocol. After the step 760, the method 700 terminates.

Figure 8:
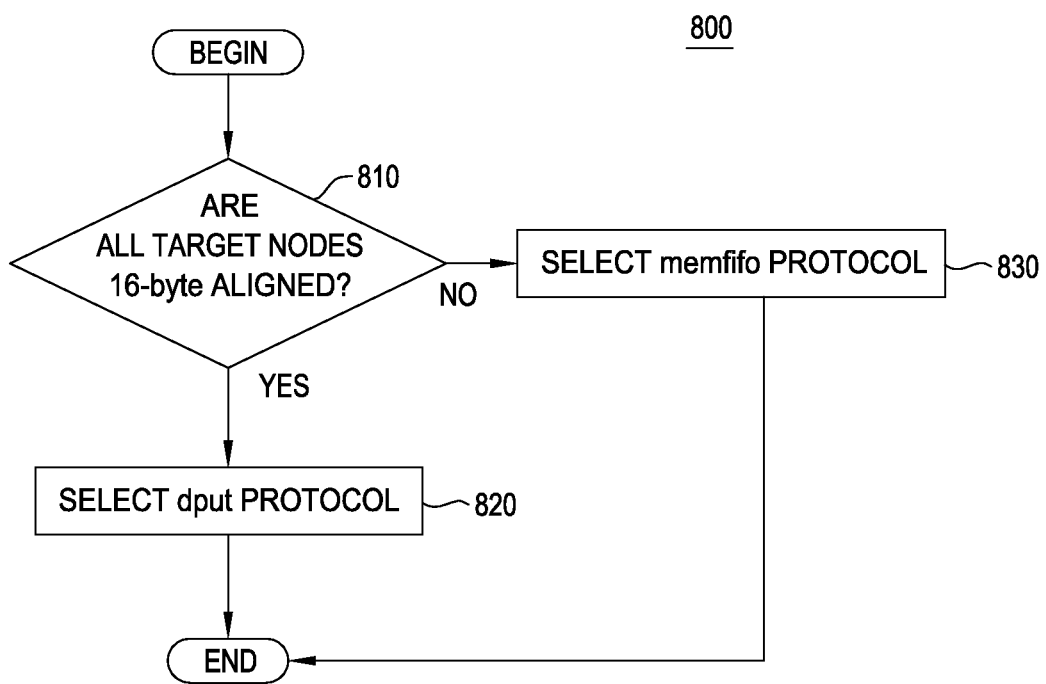
FIG. 8 is a flow diagram depicting a method for selecting a collective protocol based on a characteristic of a compute node, according to one embodiment of the invention.

FIG. 8 is a flow diagram depicting a method 800 for selecting a collective protocol based on a characteristic of a compute node, according to one embodiment of the invention. The method 800 corresponds to the step 720 of FIG. 7. As shown, the method 800 begins at step 810, where the application determines whether all target nodes are 16-byte aligned. If so, the application selects the dput protocol as the collective protocol (step 820). Otherwise, the application selects the memfifo protocol as the collective protocol (step 830). In an alternative embodiment, the application may select from three or more protocols. For example, the application may determine a subset of available protocols (having constraints that are satisfied). From the subset, the application may then select a protocol based on characteristics such as message size, partition size, communicator layout, location of the pipelining node in relation to other nodes, etc. After the step 830, the method 800 terminates.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Advantageously, embodiments of the invention provide techniques for performing a desired collective operation on a parallel computing system that includes multiple compute nodes. The compute nodes may perform multiple collective operations to effect the desired collective operation. To select protocols suitable for the multiple collective operations, the compute nodes may also perform additional collective operations. The compute nodes may also pipeline the multiple collective operations and/or the additional collective operations based on neighborhoods derived from the network topology of the compute nodes. Advantageously, the desired collective operation may be performed more efficiently on the parallel computing system.

While the foregoing is directed to embodiments of the present invention, other and further embodiments of the invention may be devised without departing from the basic scope thereof, and the scope thereof is determined by the claims that follow.

What is claimed is:

1. A computer-implemented method for performing a specified collective operation on a parallel computer comprising a plurality of compute nodes, each compute node having at least a processor and a memory, the method comprising:

performing a first collective operation by a source node on a plurality of target nodes to determine a characteristic of each of the target nodes, wherein the characteristic for each target node specifies whether a buffer of the respective target node is N-byte aligned, where N is a power of two;

from a plurality of protocols, selecting a target protocol based on a result of determining whether or not all of the target nodes are N-byte aligned;

performing the specified collective operation by the source node on the plurality of target nodes using the target protocol;

performing a second collective operation by one of the target nodes on a plurality of downstream nodes to determine a characteristic of each of the downstream nodes, wherein the characteristic for each downstream node specifies whether a buffer of the respective downstream node is N-byte aligned, where N is a power of two;

from the plurality of protocols, selecting a downstream protocol based on a result of determining whether or not all of the downstream nodes are N-byte aligned; and performing the specified collective operation by the target node on the plurality of downstream nodes using the downstream protocol.

2. The computer-implemented method of claim 1, wherein the first collective operation and the specified collective operation is selected from at least a broadcast operation, a reduce operation, a gather operation, a scatter operation, an allgather operation, and an allreduce operation.

3. The computer-implemented method of claim 1, wherein each of the plurality of protocols imposes a different precondition.

4. The computer-implemented method of claim 1, wherein the plurality of protocols comprises a memfifo protocol and a dput protocol.

5. The computer-implemented method of claim 1, wherein the characteristic for each node specifies a message size for the respective node.

6. The computer-implemented method of claim 1, wherein the plurality of compute nodes are configured to form a torus network, wherein the source node and the plurality of target nodes form a line in a first dimension of the torus network, and wherein the target node and the plurality of downstream nodes form a line in a second dimension of the torus network.

* * * * *